US012760857B2

United States Patent

(12) United States Patent
Kim

(10) Patent No.: US 12,760,857 B2
(45) Date of Patent: Oct. 13, 2026

(54) VEHICLE LAMP

(71) Applicant: SL Corporation, Daegu (KR)

(72) Inventor: Hyeongdo Kim, Gyeongsan-si (KR)

(73) Assignee: SL Corporation, Daegu (CN)

( * ) Notice: Subject to any disclaimer, the term of this patent is extended or adjusted under 35 U.S.C. 154(b) by 0 days.

(21) Appl. No.: 18/978,800

(22) Filed: Dec. 12, 2024

(65) Prior Publication Data

US 2025/0198583 A1 Jun. 19, 2025

(30) Foreign Application Priority Data

Dec. 19, 2023 (KR) ........................ 10-2023-0185385

(51) Int. Cl.

| | |
|---|---|
| ***F21S 41/265*** | (2018.01) |
| ***F21S 41/147*** | (2018.01) |
| ***F21S 41/151*** | (2018.01) |
| ***F21S 41/20*** | (2018.01) |
| ***F21S 41/25*** | (2018.01) |
| ***F21S 41/26*** | (2018.01) |
| ***F21S 41/27*** | (2018.01) |
| ***F21S 41/275*** | (2018.01) |
| ***F21S 41/32*** | (2018.01) |
| ***F21V 5/00*** | (2018.01) |

(Continued)

(52) U.S. Cl.

CPC ........... *F21S 41/265* (2018.01); *F21S 41/147* (2018.01); *F21S 41/151* (2018.01); *F21S 41/322* (2018.01); *F21S 41/20* (2018.01); *F21S 41/25* (2018.01); *F21S 41/26* (2018.01); *F21S 41/27* (2018.01); *F21S 41/275* (2018.01); *F21S 41/285* (2018.01); *F21V 5/002* (2013.01); *F21V 5/003* (2013.01); *F21V 5/004* (2013.01); *F21V 5/005* (2013.01); *F21V 7/0091* (2013.01); *G02B 3/0043* (2013.01); *G02B 3/005* (2013.01); *G02B 3/0056* (2013.01); *G02B 3/0062* (2013.01); *G02B 3/0068* (2013.01); *G02B 3/0075* (2013.01)

(58) Field of Classification Search

CPC ...... F21S 41/147; F21S 41/151; F21S 41/265; F21S 41/322; F21S 41/20; F21S 41/25; F21S 41/26; F21S 41/27; F21S 41/275; F21S 41/285; G02B 3/0043; G02B 3/0056; G02B 3/005; G02B 3/0062; G02B 3/0068; G02B 3/0075; F21V 7/0091; F21V 5/003; F21V 5/004; F21V 5/005; F21V 5/002

See application file for complete search history.

(56) References Cited

U.S. PATENT DOCUMENTS

| | | | | |
|---|---|---|---|---|
| 10,232,763 B1 * | 3/2019 | Eckstein | ............ | G02B 19/0066 |
| 2010/0165636 A1 * | 7/2010 | Chen | ..................... | F21V 7/0091 362/296.1 |

(Continued)

*Primary Examiner* — Colin J Cattanach

(74) *Attorney, Agent, or Firm* — United One Law Group LLC; Kongsik Kim; Jhongwoo Peck

(57) ABSTRACT

A vehicle lamp includes a plurality of lamp modules, and each of the plurality of lamp modules includes: a light source unit that includes at least one light source and generates light; an optical path adjustment unit that adjusts a path of the light emitted from the light source unit; and an optical unit that transmits at least some of the light emitted from the optical path adjustment unit to form a predetermined beam pattern. The optical unit is tilted in at least one direction such that a first side thereof is disposed further forward than a second side thereof.

13 Claims, 17 Drawing Sheets

(51) Int. Cl.
*F21V 7/00* (2006.01)
*G02B 3/00* (2006.01)

(56) References Cited

U.S. PATENT DOCUMENTS

| | | | | |
|---|---|---|---|---|
| 2015/0036374 | A1* | 2/2015 | Yasuda | F21S 45/47<br>362/516 |
| 2018/0335191 | A1* | 11/2018 | Stefanov | F21S 41/143 |
| 2019/0072252 | A1* | 3/2019 | Moser | F21S 41/68 |
| 2020/0207257 | A1* | 7/2020 | Choi | B60Q 1/2607 |
| 2020/0386382 | A1* | 12/2020 | Choi | F21S 41/285 |
| 2021/0381673 | A1* | 12/2021 | Lee | F21S 43/15 |
| 2024/0151378 | A1* | 5/2024 | Dong | F21S 41/321 |

* cited by examiner

VEHICLE LAMP

CROSS-REFERENCE TO RELATED APPLICATION

This application claims priority from Korean Patent Application No. 10-2023-0185385 filed on Dec. 19, 2023, which is incorporated herein by reference in its entirety.

BACKGROUND

1. Technical Field

The present disclosure relates to a vehicle lamp, and more specifically, to a vehicle lamp capable of forming an optimal beam pattern.

2. Description of the Related Art

In general, various lamps are provided in vehicles for the purpose of enabling the drivers to easily identify objects around the vehicles during low-light conditions (e.g., night-time driving) and to signal the vehicles' driving status to surrounding vehicles or pedestrians.

For example, headlamps and fog lamps are primarily intended for illumination purposes, while turn signal lamps, tail lamps, and brake lamps are primarily intended for signaling purposes. Each lamp is regulated by laws regarding its installation standards and specifications to ensure that it fully performs its intended functions.

Among these, the headlamps play an important role in ensuring safe driving by projecting light in the direction of the vehicles' movement to secure the drivers' forward visibility.

The headlamps can form a low beam pattern in which light is projected below the cutoff line, or a high beam pattern in which at least part of the light is projected above the cutoff line. When forming the low beam pattern, if light is projected above the cutoff line, it can cause glare to the drivers of the vehicles ahead. Therefore, a means to prevent light from being projected above the cutoff line during the formation of the low beam pattern is required.

SUMMARY

Aspects of the present disclosure provide a vehicle lamp that can form an optimal beam pattern by preventing light from being emitted in unnecessary or undesired directions.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may be configured to form a predetermined beam pattern using a plurality of lamp modules. Each of the plurality of lamp modules may include a light source unit that includes at least one light source and generates light; an optical path adjustment unit that adjusts a path of the light emitted from the light source unit; and an optical unit that transmits at least some of the light emitted from the optical path adjustment unit to form the predetermined beam pattern. The optical unit may be tilted in at least one direction such that a first side thereof is disposed further forward than a second side thereof.

The light source unit may be disposed such that an optical axis thereof is tilted in at least one direction with respect to a central axis of the optical path adjustment unit.

The plurality of lamp modules may be disposed such that a first side thereof is disposed further forward than a second side thereof in at least one direction.

The light source units of the plurality of lamp modules may be installed on a common substrate. The common substrate may be tilted in at least one direction such that a first side thereof is disposed further forward than a second side thereof.

The optical path adjustment unit may include an incident part, into which the light emitted from the light source unit is incident, and an emission part, through which the light incident into the incident part is emitted. The light incident into the incident part may be formed into parallel light and emitted through the emission part. The incident part may include a first incident surface formed to be convex toward the light source unit; a second incident surface that protrudes toward the light source unit from a periphery of the first incident surface; and a reflective surface that reflects light incident on the second incident surface toward the emission part.

The emission part may include a plurality of emission surfaces having different curvatures. The emission part may include a first emission surface formed to be convex toward the front; and a second emission surface formed with a substantially flat shape around the first emission surface, and the first emission surface may have a greater curvature than a first incident surface, which is formed in the incident part and convex toward the light source unit.

The optical unit may include a plurality of incident lenses; a plurality of emission lenses corresponding to the plurality of incident lenses; a deposition layer disposed between the plurality of incident lenses and the plurality of emission lenses to obstruct some light from proceeding toward the plurality of emission lenses; and a plurality of apertures formed in the deposition layer by removing material of the deposition layer, thereby allowing some light to be transmitted toward the plurality of emission lenses.

The plurality of incident lenses and the plurality of emission lenses may be formed with different curvatures on both sides, in at least one direction, with respect to a reference line that is parallel to a front-rear direction.

At least some of the plurality of apertures may be arranged along a left-right direction and interconnected to form a single horizontal slit.

Each of the plurality of apertures may be formed in an overlapping area where the plurality of incident lenses and the plurality of emission lenses overlap. The overlapping area may be an area where an incident lens array, which is defined by incident lenses that are arranged in a row in a left-right direction, overlaps with an emission lens array, which is defined by emission lenses that are arranged in a row in the left-right direction. When the optical unit, which is tilted in at least one direction relative to the front-rear direction, is viewed from the front-rear direction, the overlapping area may correspond to an area where the incident lens array and the emission lens array overlap.

A bottom edge of each of the plurality of apertures may be disposed at or near a rear focus of a corresponding emission lens among the plurality of emission lenses, and a top edge of each of the plurality of apertures may be disposed at or below a top edge of the overlapping area.

According to the vehicle lamp of the present disclosure, the following effects can be achieved.

Since apertures are formed within the overlapping area where a plurality of incident lenses and a plurality of emission lenses overlap, the light incident through the incident lenses outside the overlapping area may be prevented from being emitted through the emission lenses outside the overlapping area. This configuration prevents light from being projected in unintended directions, thereby reducing glare.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
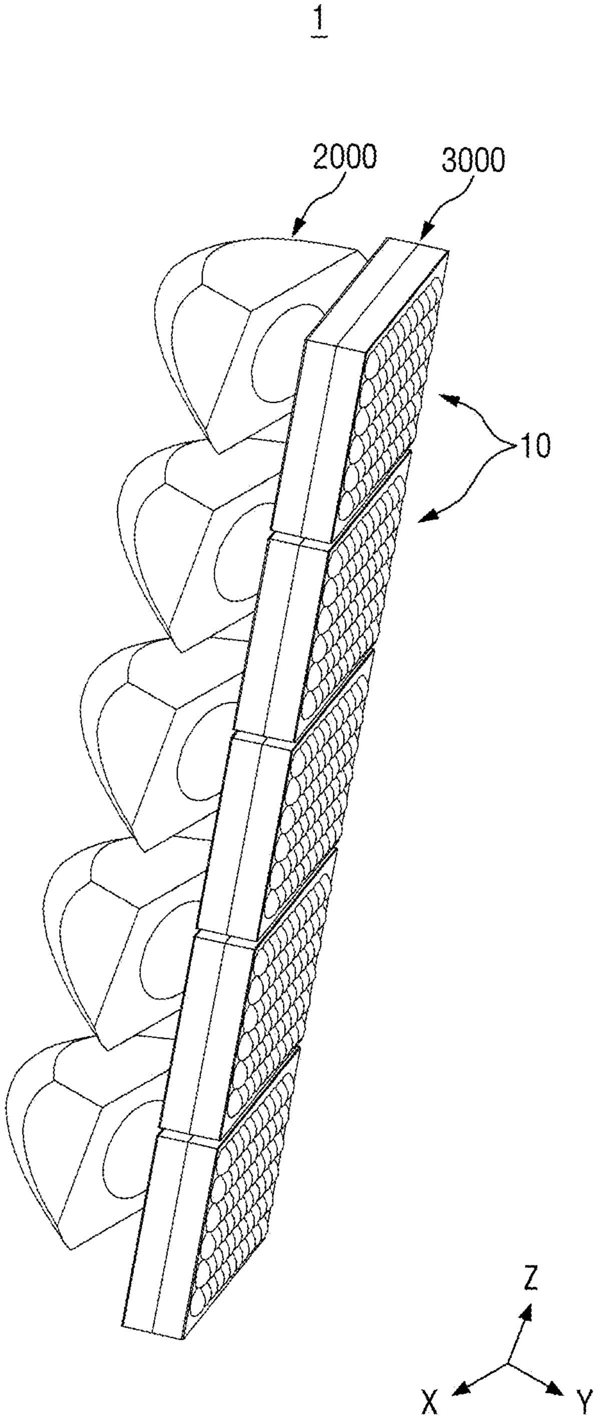
FIGS. 1 and 2 are perspective views illustrating a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. In the drawings, respective components may be enlarged or reduced in size for convenience of explanation.

Embodiments of the present disclosure will hereinafter be described with reference to the accompanying drawings.

Figure 2:
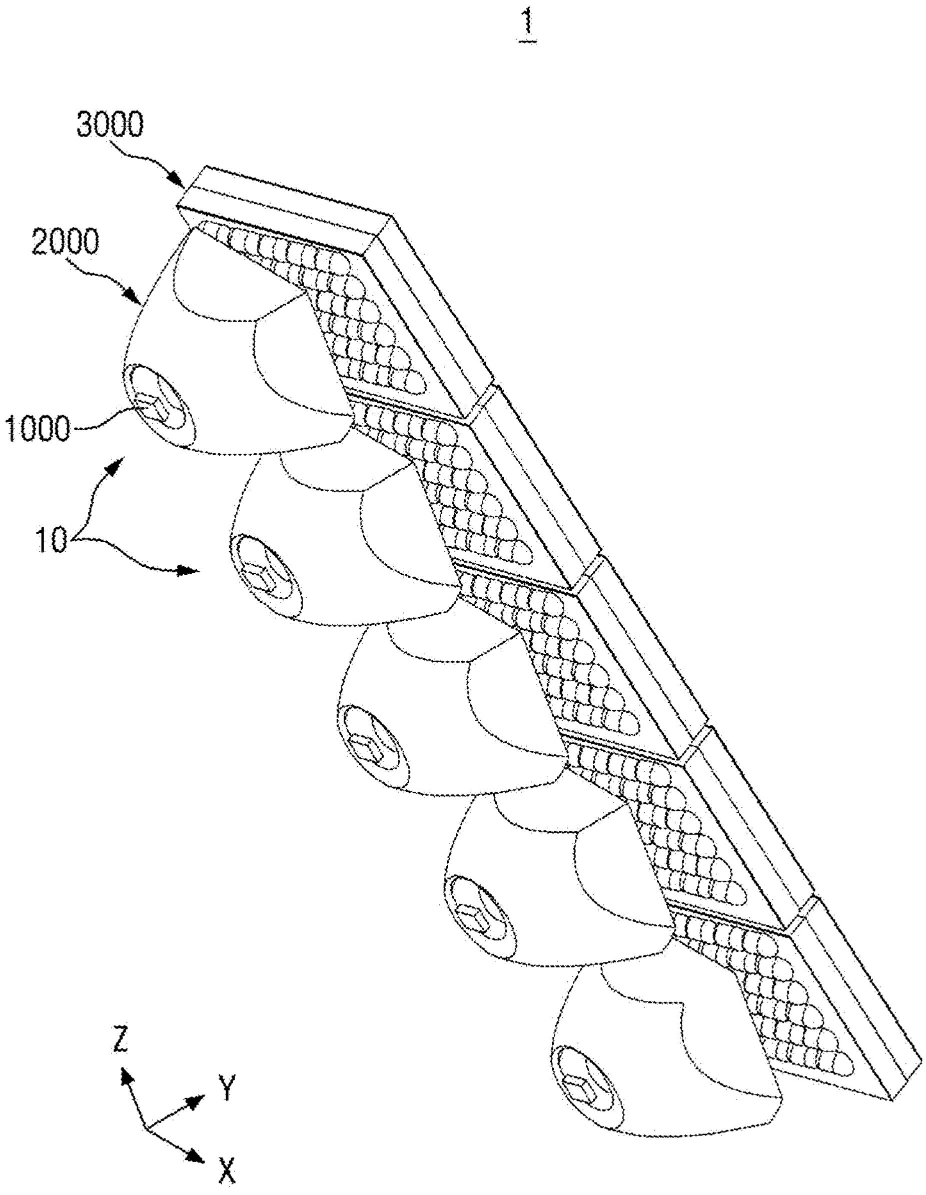
Figure 3:
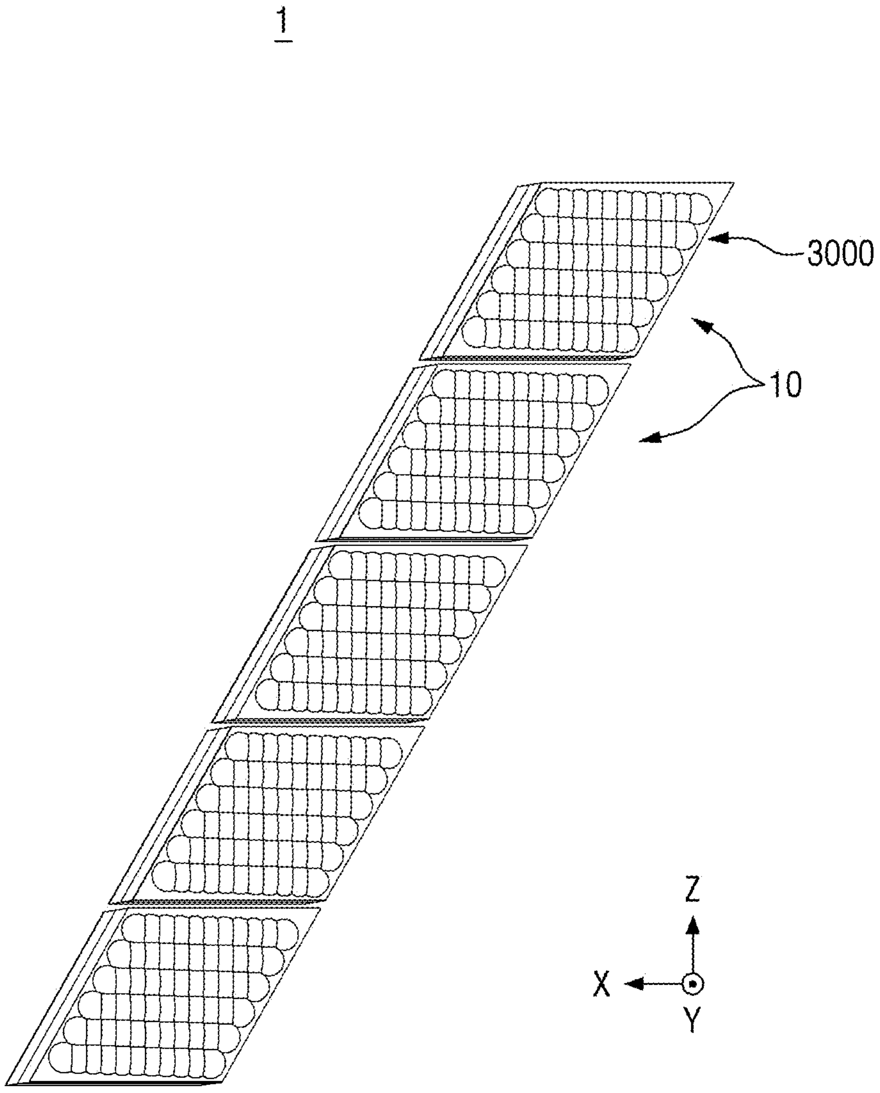
FIG. 3 is a front view illustrating the vehicle lamp according to an embodiment of the present disclosure.
Figure 4:
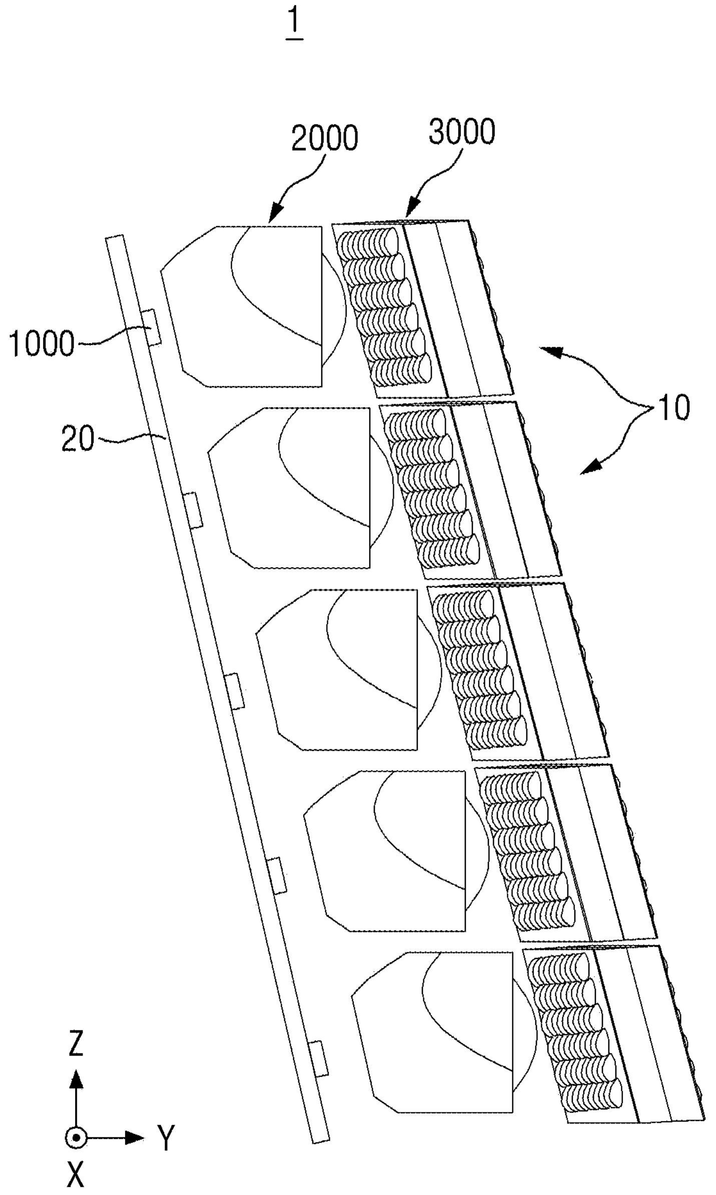
FIG. 4 is a side view illustrating the vehicle lamp according to an embodiment of the present disclosure.
Figure 5:
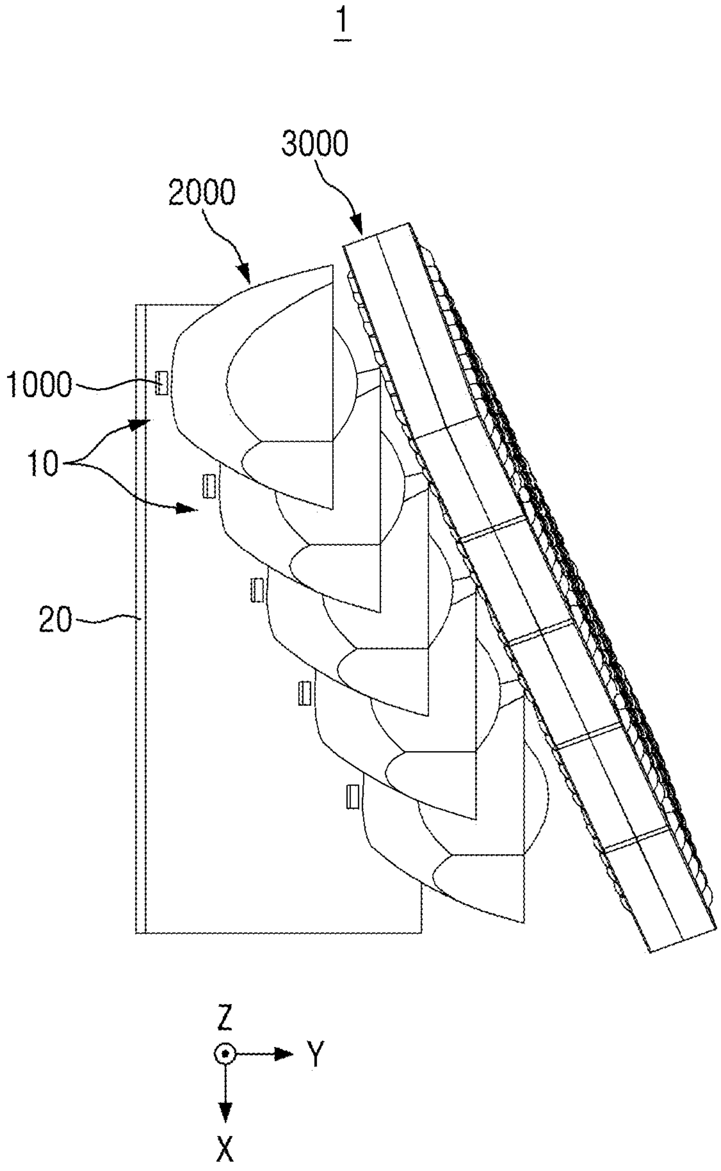
FIG. 5 is a plan view (i.e., top view) illustrating the vehicle lamp according to an embodiment of the present disclosure.

FIGS. 1 and 2 are perspective views illustrating a vehicle lamp according to an embodiment of the present disclosure, FIG. 3 is a front view illustrating the vehicle lamp according to an embodiment of the present disclosure, FIG. 4 is a side view illustrating the vehicle lamp according to an embodiment of the present disclosure, and FIG. 5 is a plan view illustrating the vehicle lamp according to an embodiment of the present disclosure.

Referring to FIGS. 1 through 5, a vehicle lamp 1 according to an embodiment of the present disclosure may include a plurality of lamp modules 10 that are arranged along at least one direction. Here, an X axis refers to a left-right direction, i.e., the width direction or the lateral direction of a vehicle, a Y axis refers to a front-rear direction, i.e., the driving direction or the longitudinal direction of the vehicle, and a Z axis refers to an up-down direction, i.e., the height direction or the vertical direction of the vehicle. However, the present disclosure is not limited to this, and depending on the position or direction in which the vehicle lamp 1 is installed, the actual directions represented by the X-axis, Y-axis, and Z-axis may vary.

In this embodiment, the vehicle lamp 1 may be used as a headlamp that illuminates the vehicle's driving direction when the vehicle is operated at night or in a dark place such as a tunnel, to secure forward visibility, but the present disclosure is not limited thereto. The vehicle lamp 1 may be used not only as a headlamp but also as various other lamps installed in the vehicle, such as a tail lamp, position lamp, brake lamp, daytime running lamp, turn signal lamp, fog lamp, or backup lamp.

Figure 6:
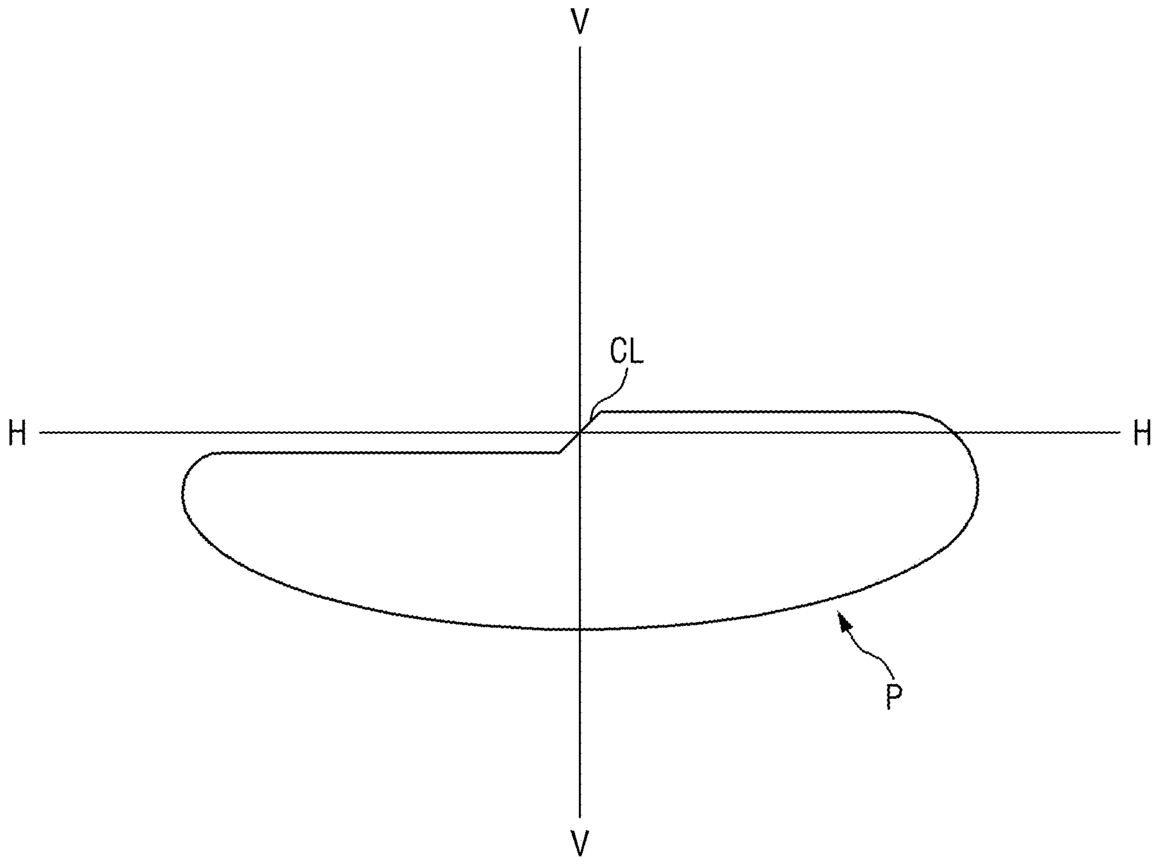
FIG. 6 is a schematic diagram illustrating the beam pattern formed by the vehicle lamp according to an embodiment of the present disclosure.

When the vehicle lamp 1 is used as a headlamp, it may form at least one of the following: a low beam pattern, where light is projected below a predetermined cutoff line to prevent glare for the drivers of preceding or oncoming vehicles while securing a wider field of view in front of the vehicle; and a high beam pattern, where at least part of the light is projected above the cutoff line to secure a longer-range field of view in front of the vehicle. In this embodiment, the vehicle lamp 1 will hereinafter be described as forming, for example, a low beam pattern with a predetermined cutoff line CL, as illustrated in FIG. 6.

Meanwhile, in this embodiment, the vehicle lamp 1 may include a plurality of lamp modules 10 that are arranged along the up-down direction, but the present disclosure is not limited thereto. The number of lamp modules 10 and their arrangement direction in the vehicle lamp 1 may vary depending on the light distribution characteristics of the beam pattern to be formed by the vehicle lamp 1, i.e., the position, size, shape, and brightness of the area to be illuminated by the vehicle lamp 1.

The lamp modules 10 may be arranged in the up-down direction such that they are slanted toward the front side and toward the right side of the vehicle going from top to bottom such that they conform to the body contour of the vehicle.

In other words, the vehicle lamp 1 may be housed within an internal space formed by a lamp housing and a cover lens attached to the lamp housing. This configuration is for arranging the lamp modules 10 to correspond to the shape of the cover lens that forms parts of the vehicle's body lines.

For example, when the cover lens has a flat shape facing directly forward, the lamp modules 10 may be arranged in the up-down direction to be aligned with one another in both the front-rear and left-right directions. Conversely, if the cover lens has a flat or curved shape formed at a predetermined angle relative to the front in at least one direction, the lamp modules 10 may be arranged in the up-down direction to be offset from one another in at least one of the front-rear and left-right directions.

The beam pattern formed by the vehicle lamp 1 may be created by the superposition or combination of the beam patterns formed by the respective lamp modules 10. For example, the beam pattern formed by the vehicle lamp 1 may result from the superposition of beam patterns with the same light distribution characteristics formed by the lamp modules 10, or from the combination of beam patterns with different light distribution characteristics formed by the lamp modules 10.

Figure 7:
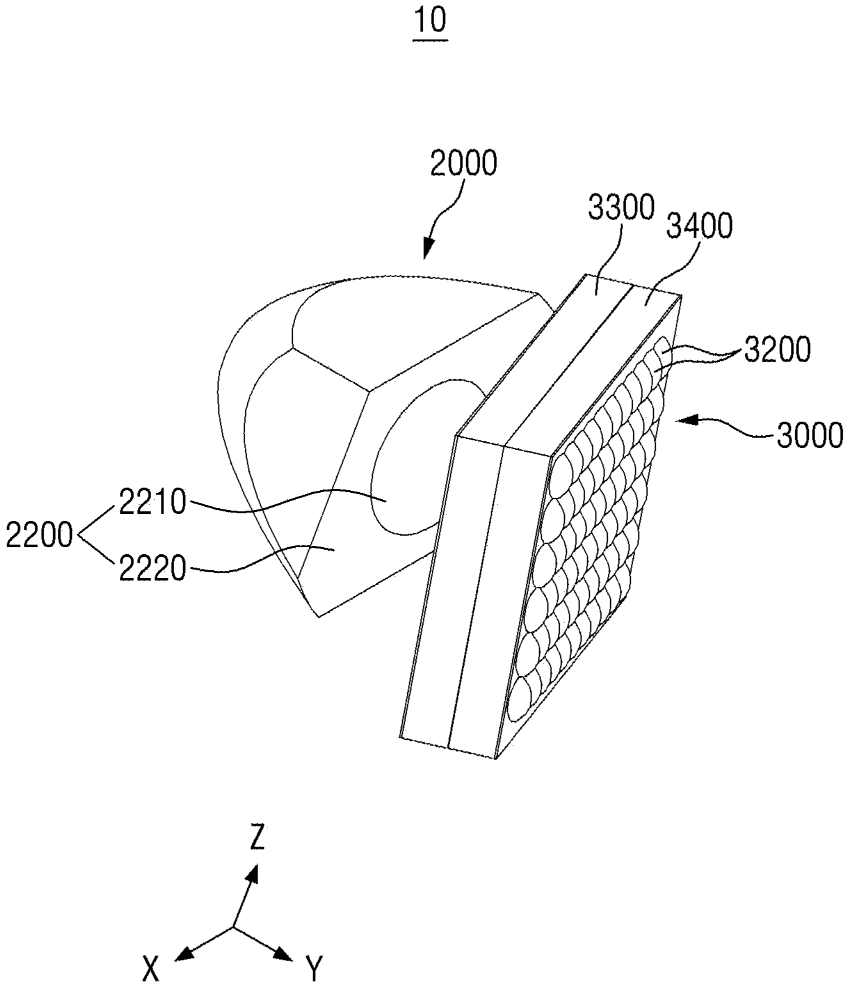
FIGS. 7 and 8 are perspective views illustrating a lamp module according to an embodiment of the present disclosure.
Figure 8:
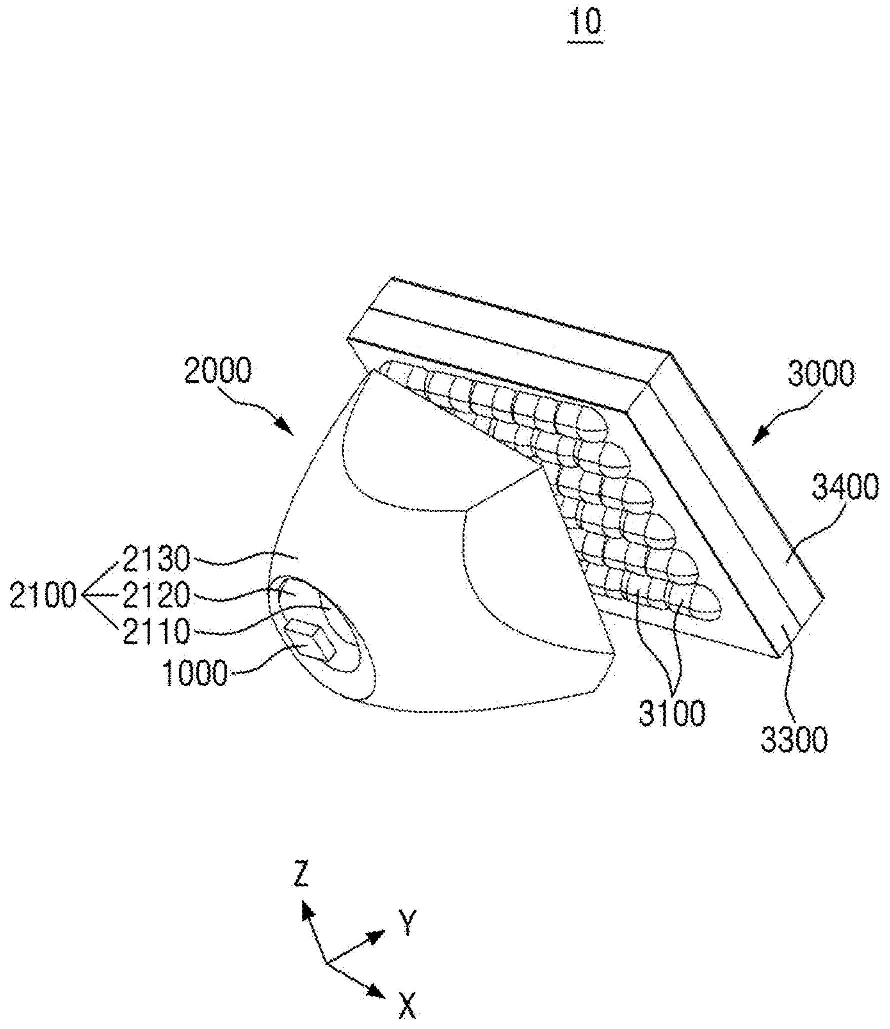
Figure 9:
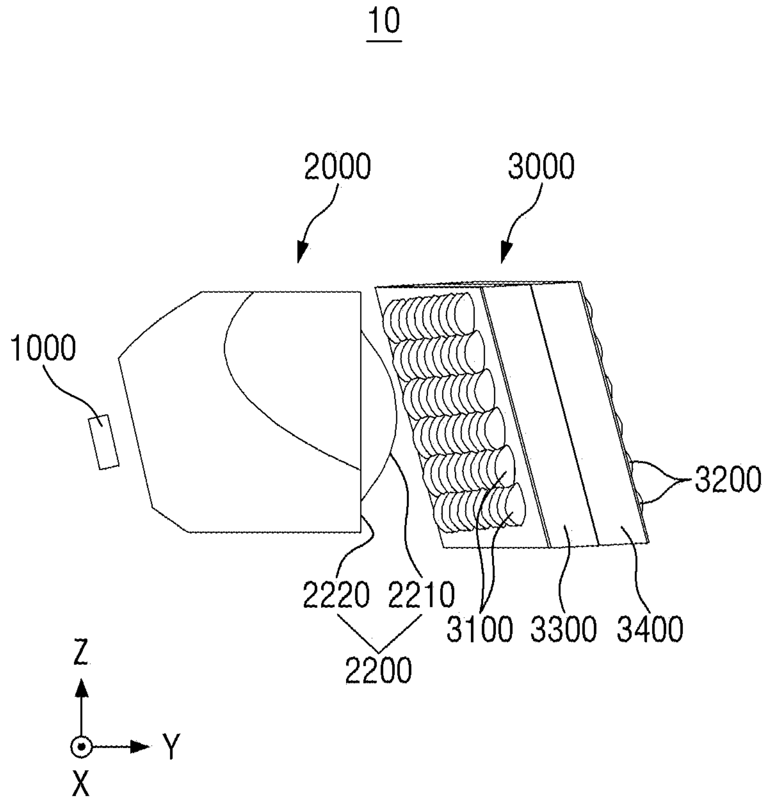
FIG. 9 is a side view illustrating the lamp module according to an embodiment of the present disclosure.
Figure 10:
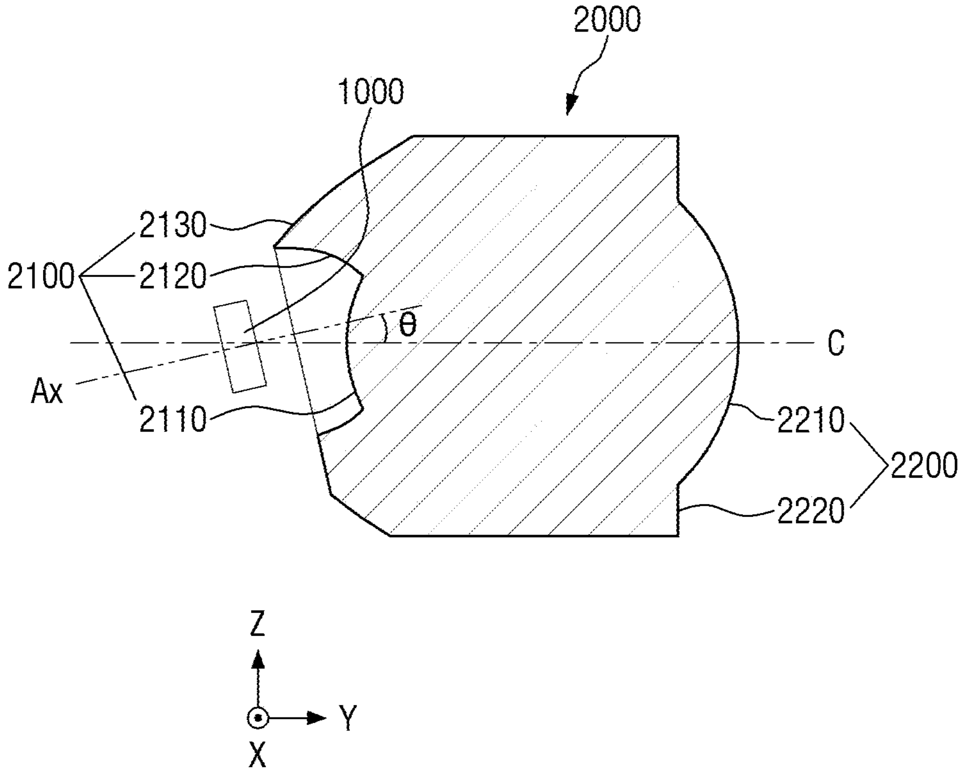
FIG. 10 is a cross-sectional view illustrating an optical path adjustment unit according to an embodiment of the present disclosure.

FIGS. 7 and 8 are perspective views illustrating a lamp module according to an embodiment of the present disclosure, FIG. 9 is a side view illustrating the lamp module according to an embodiment of the present disclosure, and FIG. 10 is a cross-sectional view illustrating an optical path adjustment unit of the lamp module according to an embodiment of the present disclosure. FIGS. 7 through 10 illustrate one of the lamp modules 10, and the description of the lamp module 10 illustrated in FIGS. 5 through 8 may be similarly applicable to the other lamp modules 10.

Referring to FIGS. 7 through 9, a lamp module 10 according to an embodiment of the present disclosure may include a light source unit 1000, an optical path adjustment unit 2000, and an optical unit 3000.

The light source unit 1000 may include one or more light sources that emit light with the quantity and/or color suitable for the purpose of the vehicle lamp 1. Depending on the purpose of the vehicle lamp 1, at least one of the intensity or color of the light emitted from the light source unit 1000 may be varied.

In this embodiment, semiconductor light-emitting devices such as light-emitting diodes (LEDs) may be used as the light sources of the light source unit 1000, but the present disclosure is not limited thereto. Various types of light sources such as laser diodes (LDs) or bulbs may also be used as the light sources of the light source unit 1000. Additionally, components such as reflectors, mirrors, prisms, or phosphors may be additionally used depending on the type of the light sources to control the brightness, path, or color of light.

The light source unit 1000 may be disposed with its optical axis Ax tilted at a predetermined angle θ in at least one direction with respect to a central axis C of the optical path adjustment unit 2000. In this embodiment, an example will hereinafter be described where the optical axis Ax of the light source unit 1000 is tilted upward relative to the central axis C to enable the installation of the light source unit 1000 on a single common substrate 20.

For example, when a plurality of lamp modules 10 are arranged vertically, and the plurality of lamp modules 10 are disposed further forward and toward the right along a downward direction, the common substrate 20 may also be tilted such that it is disposed further forward along the downward direction, as illustrated in FIGS. 4 and 5. As a result, the optical axis Ax of the light source unit 1000 installed on the common substrate 20 may be understood to be tilted upward relative to the central axis C.

In other words, the direction in which the common substrate 20 is tilted may vary depending on the arrangement direction of the light source unit 1000 of each of the plurality of lamp modules 10, and the direction in which the optical axis Ax of the light source unit 1000 installed on the common substrate 20 is tilted may also vary.

When the light source unit 1000 of each of the plurality of lamp modules 10 is installed on a single common substrate 20, the number of components can be reduced, the assembly process can be simplified, and a more efficient heat dissipation design can be implemented, compared to using individual substrates for each of the light source units 1000 of the plurality of lamp modules 10.

Herein, the optical axis Ax of the light source unit 1000 may be understood as a line that passes perpendicularly through the center of the light emission area formed by at least one light source. In some embodiments, the optical axis Ax of the light source unit 1000 may be understood to be perpendicular to the common substrate 20.

For example, when the light source unit 1000 includes a single light source, the optical axis Ax may be understood as the axis that passes perpendicularly through the center of the light-emitting surface of the single light source. When the light source unit 1000 includes multiple light sources, the optical axis Ax may be understood as the axis that passes perpendicularly through the center of the light emission area formed by the light-emitting surfaces of the multiple light sources.

The optical path adjustment unit 2000 may adjust the path of light emitted from the light source unit 1000 such that the light may travel along a predetermined path. In this embodiment, the optical path adjustment unit 2000 may convert the light emitted from the light source unit 1000 into a substantially parallel light beam for emission.

The optical path adjustment unit 2000 may include an incident part 2100 and an emission part 2200. The incident part 2100 may include a first incident surface 2110, a second incident surface 2120, and a reflective surface 2130. The proximal end of the incident part 2100 that faces the light source unit 1000 may be inclined to correspond to the tilting direction of the optical axis Ax.

In other words, in this embodiment, since the optical axis Ax of the light source unit 1000 is tilted upward relative to the central axis C of the optical path adjustment unit 2000, the lower side of the proximal end of the incident part 2100 may be disposed more forward compared to the upper side of the proximal end of the incident part 2100, and the central axis C of the optical path adjustment unit 2000 may be understood as an axis that is parallel to the front-rear direction and passes through the centers of the incident part 2100 and the emission part 2200.

The first incident surface 2110 may be formed to be convex toward the light source unit 1000 around the central axis C, the second incident surface 2120 may be formed to protrude rearward toward the light source unit 1000 from the circumference or periphery of the first incident surface 2110, and the reflective surface 2130 may be formed to extend forward from the proximal end of the second incident surface 2120, thereby reflecting the light incident on the second incident surface 2120 to proceed forward.

For example, the reflective surface 2130 may be formed to have a curved shape such that the distance from the central axis C gradually increases going from the proximal end of the second incident surface 2120 toward the front. This configuration allows the light incident on the second incident surface 2120 to be reflected forward.

The emission part 2200 may include a first emission surface 2210 and a second emission surface 2220. In this embodiment, an example will be described where the first emission surface 2210 and the second emission surface 2220 are formed with different curvatures to ensure that the light incident on the incident part 2100 is refracted at an appropriate refraction angle, allowing it to be emitted as substantially parallel light along the direction parallel to the central axis C of the optical path adjustment unit 2000.

For example, the first emission surface 2210 may be formed to have a convex shape toward the front, and the second emission surface 2220 may be formed to have a generally flat shape, substantially encompassing the first emission surface 2210. In this example, the light emitted from the first emission surface 2210 may be refracted at a relatively greater (e.g., wider) angle.

In this embodiment, an example will be described where the first incident surface 2110 is formed to be convex rearward facing the light source unit 1000, and the first emission surface 2210 is formed to be convex toward the front. The first emission surface 2210 may be formed with a greater curvature than the first incident surface 2110, i.e., the first emission surface 2210 may have a smaller radius of curvature than the first incident surface 2110, but the present disclosure is not limited thereto. That is, the formation angles or curvatures of the first incident surface 2110, the second incident surface 2120, and the reflective surface 2130, as well as the formation angles or curvatures of the first emission surface 2210 and the second emission surface 2220, may be varied to allow the light incident on the incident part 2100 to be emitted as substantially parallel light.

Figure 11:
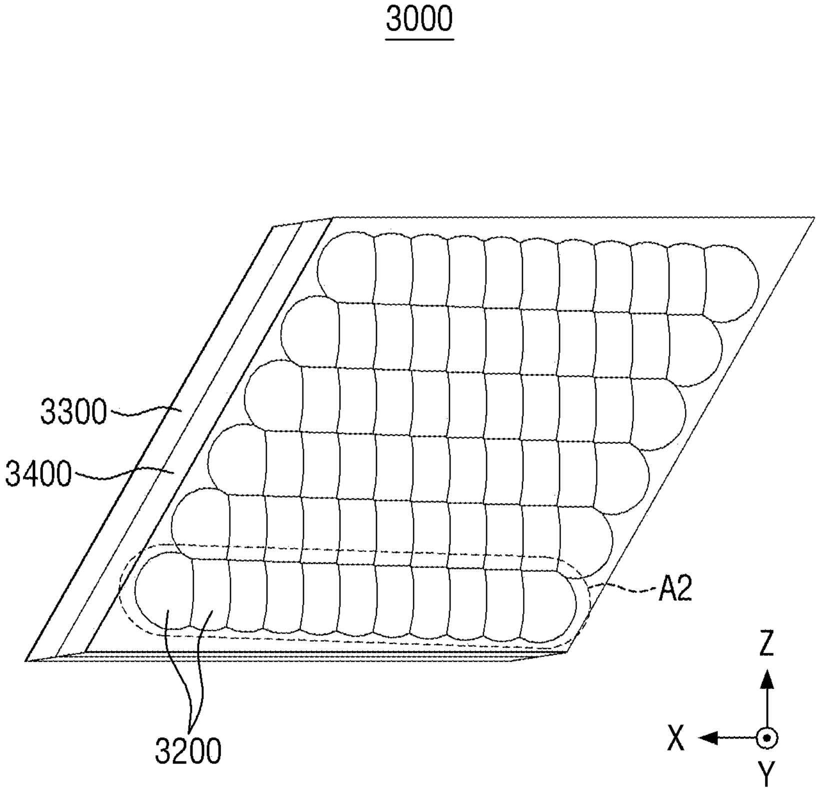
FIG. 11 is a front view illustrating the optical unit according to an embodiment of the present disclosure.
Figure 12:
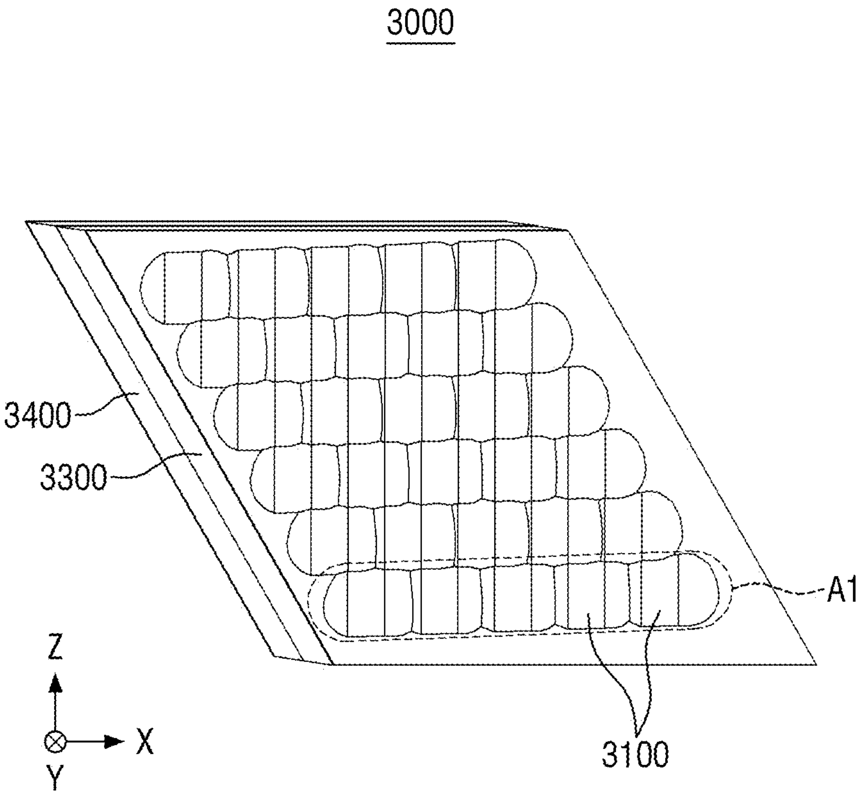
FIG. 12 is a rear view illustrating the optical unit according to an embodiment of the present disclosure.
Figure 13:
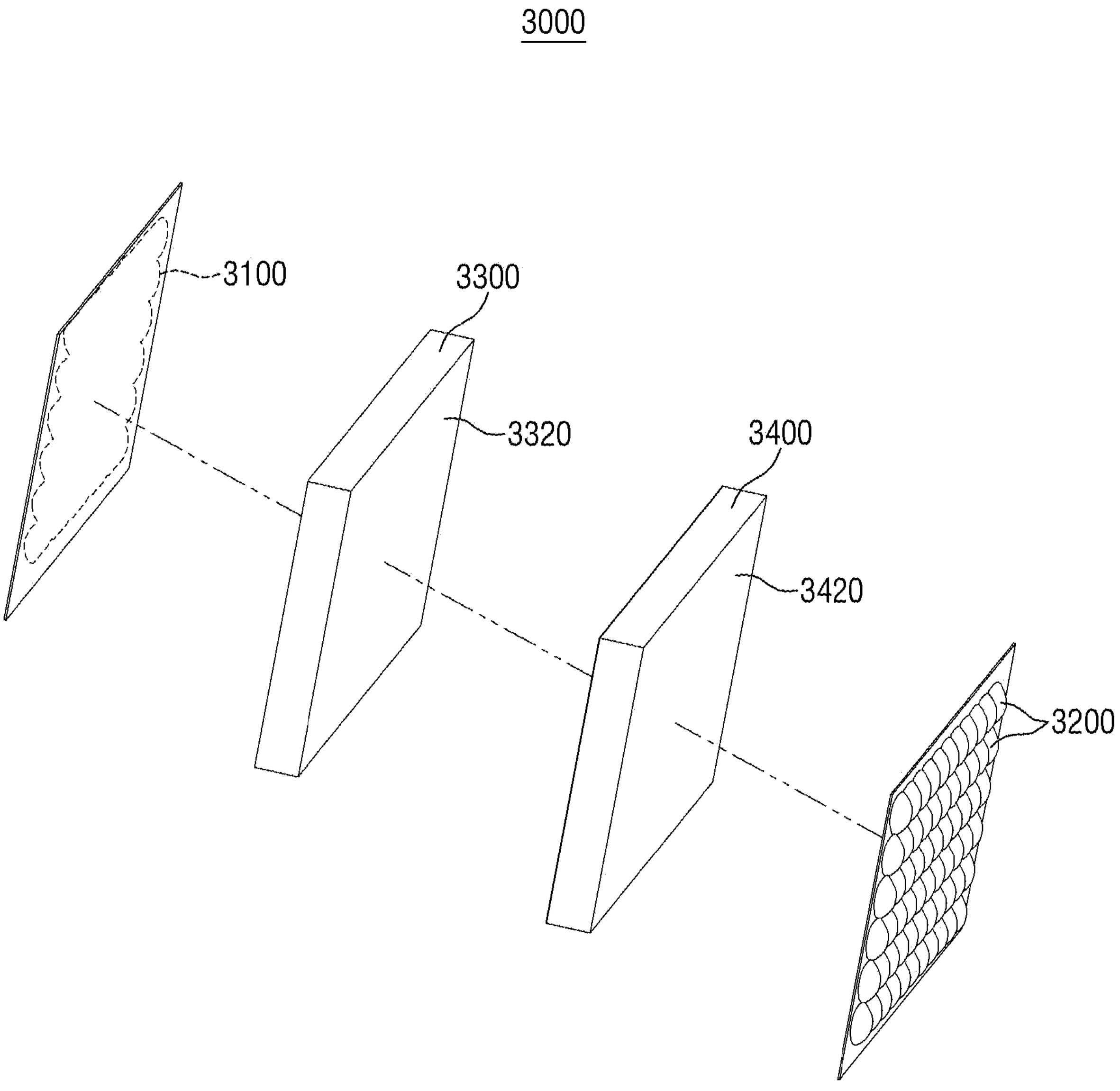
FIGS. 13 and 14 are exploded perspective views illustrating the optical unit according to an embodiment of the present disclosure.
Figure 14:
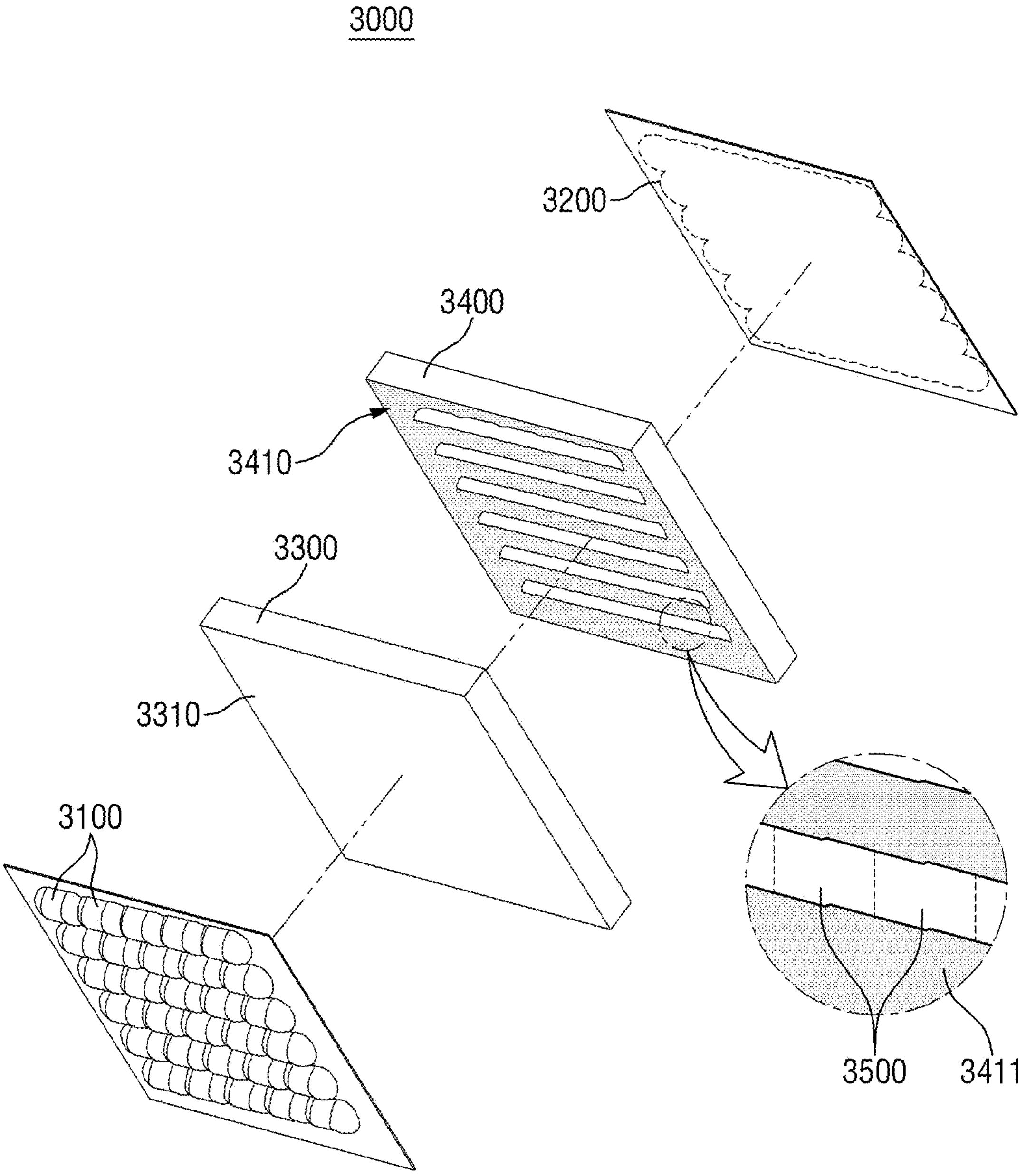

FIG. 11 is a front view illustrating an optical unit according to an embodiment of the present disclosure, FIG. 12 is a rear view of the optical unit according to an embodiment of the present disclosure, and FIGS. 13 and 14 are exploded perspective views of the optical unit according to an embodiment of the present disclosure.

Referring to FIGS. 11 through 14, an optical unit 3000 according to an embodiment of the present disclosure may include a plurality of incident lenses 3100, a plurality of emission lenses 3200, a first light transmission part 3300, and a second light transmission part 3400.

The incident lenses 3100 may be arranged on an incident surface 3310 of the first light transmission part 3300, and the emission lenses 3200 may be arranged on an emission surface 3420 of the second light transmission part 3400. An emission surface 3320 of the first light transmission part 3300 and an incident surface 3410 of the second light transmission part 3400 may be disposed adjacent to each other to either face each other or be in contact with each other.

A lateral row of incident lenses 3100 may be arranged to form an incident lens array A1, which extends in the left-right direction, and a plurality of incident lens arrays A1 may be arranged along the up-down direction. Similarly, a lateral row of emission lenses 3200 may be arranged to form an emission lens array A2, which extends in the left-right direction, and a plurality of emission lens arrays A2 may be arranged in the up-down direction.

A deposition layer 3411 may be formed on the incident surface 3410 of the second light transmission part 3400. A plurality of apertures 3500 may be formed on the deposition layer 3411 by, for example, removing part of the deposition layer 3411 using a material removal process such as etching. The deposition layer 3411 may be formed of a material and/or color capable of blocking light, and each of the apertures 3500 may transmit some of the light toward the corresponding emission lens 3200, thereby forming a low beam pattern P having a cut-off line CL, as illustrated in FIG. 6. As such, each of the apertures 3500 may have a lower edge (and also an upper edge) bearing the shape of the cut-off line CL to be formed.

In some embodiments, the deposition layer 3411 and the plurality of apertures 3500 may be formed on the emission surface 3320 of the first light transmission part 3300. In some embodiment, a separate and additional layer (e.g., a film) may be interposed between the emission surface 3320 of the first light transmission part 3300 and the incident surface 3410 to function as the deposition layer 3411 having apertures 3500.

The lower edge of each of the apertures 3500 may be disposed at or near the rear focus of the corresponding emission lens 3200, thereby blocking the light below the rear focus of the corresponding emission lens 3200 from proceeding toward the emission lens 3200. If light passes below the rear focus of each of the emission lenses 3200, the light may be refracted and emitted in a relatively upward direction. Such an upward emission may cause glare for the drivers of oncoming vehicles by being irradiated to the area above the cut-off line CL. Therefore, the bottom edge of each of the apertures 3500 may be disposed at or near the rear focus of the corresponding emission lens 3200, thereby blocking light below the rear focus of the corresponding emission lens 3200. Here, the rear focus may be formed as a point, line, plane, space, or a combination thereof, depending on the area where light is actually concentrated.

Adjacent apertures 3500 in the left-right direction may be interconnected to form a horizontal slit. As a result, the left-right width of each beam pattern formed by the vehicle lamp 1 can be expanded, improving the spread characteristics compared to when the adjacent apertures 3500 in the left-right direction are separated by the deposition layer 3411.

Referring to FIG. 14, dashed lines indicate an (imaginary) interface between adjacent apertures 3500 in the left-right direction. The interface may correspond to an interface between adjacent emission lenses 3200 in the left-right direction within the single emission lens array A2.

In this embodiment, the optical unit 3000 of each of the lamp modules 10 may be disposed such that the lower part is disposed further forward than the upper part in the up-down direction, and the lower part is disposed further to the right than the upper part in the left-right direction. As a result, even when the cover lens is formed at an inclination in at least one direction relative to the front of the vehicle, the optical unit 3000 may form a unified appearance as a single optical unit, improving integration and creating a more uniform lighting image.

In other words, when the optical unit 3000 of each of the lamp modules 10 has a flat shape facing directly forward, the optical units 3000 of the lamp modules 10 may need to be arranged with steps formed between adjacent lamp modules 10 in at least one direction, depending on the shape of the cover lens. The formation of steps can reduce the sense of integration and result in a non-uniform lighting image. Conversely, in this embodiment, since the optical units 3000 of the lamp modules 10 are tilted in at least one direction, even if the lamp modules 10 are misaligned according to the shape of the cover lens, the optical units 3000 can still form a more unified appearance as a single optical unit.

Figure 15:
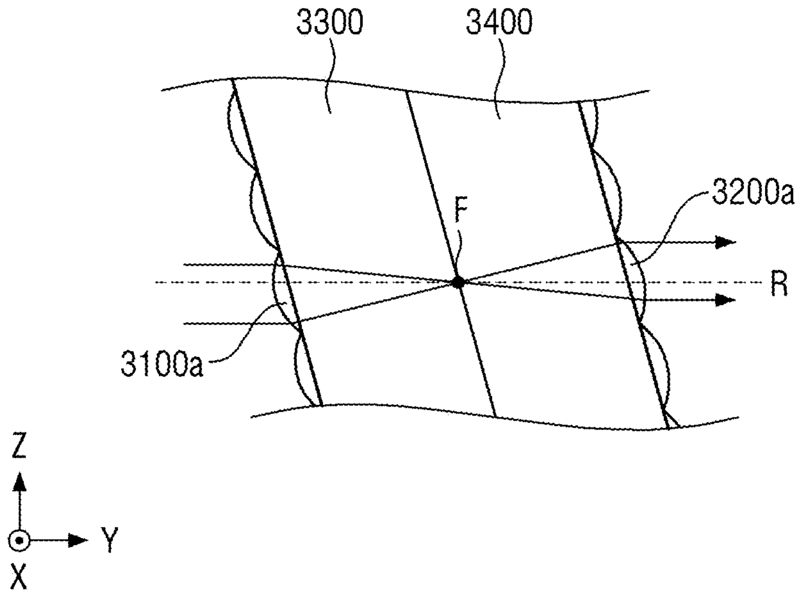
FIG. 15 is a schematic diagram illustrating incident lenses and respective emission lenses of the optical unit according to an embodiment of the present disclosure.

As described above, when the optical unit 3000 of each of the lamp modules 10 is tilted in at least one direction, as illustrated in FIG. 15, the corresponding incident lens 3100*a* and emission lens 3200*a* may be misaligned in at least one direction. Even in this case, since the light emitted from the optical unit 3000 needs to progress forward, the corresponding incident lens 3100*a* and emission lens 3200*a* may be formed with different curvatures on both sides with respect to a reference line R that is parallel to the front-rear or horizontal direction.

FIG. 15 illustrates an example where the optical unit 3000 is tilted such that the lower part is disposed further forward than the upper part. In this case, the incident lens 3100*a* may be formed with different curvatures in the upper portion and the lower portion with respect to the reference line R. Additionally or alternatively, the emission lens 3200*a* may be formed with different curvatures in the upper portion and the lower portion thereof with respect to the reference line R. In other words, each of the incident lens 3100*a* and the emission lens 3200*a* may be vertically asymmetrical with respect to the reference line R. The reference line R may be understood as a line that is parallel to the front-rear direction and passes through a rear focus F of the corresponding emission lens 3200*a*.

Meanwhile, the apertures 3500 may be formed in the overlapping areas of the respective incident lenses 3100 and emission lenses 3200 when viewed from the front of the vehicle lamp 1.

According to the present disclosure, the optical unit 3000 may be tilted such that the lower part is disposed further forward than the upper part, and the right side may be disposed further forward than the left side. As a result, when viewed from the front of the vehicle lamp 1, there may be cases where some of the incident lenses 3100 and emission lenses 3200 do not overlap. If the apertures 3500 were formed in areas where the incident lenses 3100 do not overlap with the respective emission lenses 3200, the emission of light would be more difficult to control, and unnecessary light might be projected in unintended directions.

Figure 16:
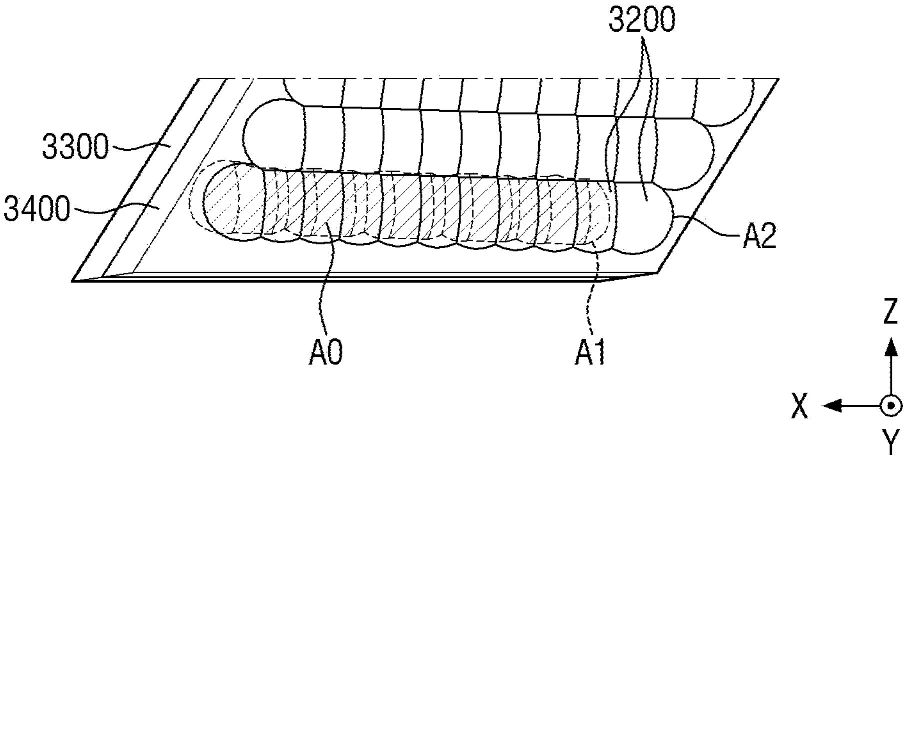
FIG. 16 is a schematic diagram illustrating the overlapping area between a plurality of incident lenses and a plurality of emission lenses according to an embodiment of the present disclosure.

FIG. 16 is a schematic diagram illustrating the overlapping area between a plurality of incident lenses and a plurality of emission lenses according to an embodiment of the present disclosure. FIG. 16 illustrates an example of a corresponding pair of an incident lens array A1 formed by a plurality of incident lenses 3100 and an emission lens array A2 formed by a plurality of emission lenses 3200.

Referring to FIG. 16, when an optical unit 3000 is tilted such that one side is disposed further forward than the other in at least one direction, the incident lens array A1 formed by the incident lenses 3100 may not be aligned with the emission lens array A2 formed by the emission lenses 3200 in at least one direction. As a result, an overlapping area A0 where the incident lens array A1 and the emission lens array A2 overlap with each other may be relatively smaller than the areas of the incident lens array A1 and the emission lens array A2.

Since it is more difficult to control the path of light incident on incident lenses 3100 that do not fall within the overlapping area A0 of the incident lens array A1 and the emission lens array A2, the light may not proceed toward the emission lens array A2 but instead move toward an adjacent emission lens array, above or below the emission lens array A2, causing light to be emitted in an unintended direction. Similarly, light emitted through emission lenses 3200 that are not within the overlapping area A0 may also be more difficult to control, leading to the emission of light in an unintended direction and potentially causing glare.

Figure 17:
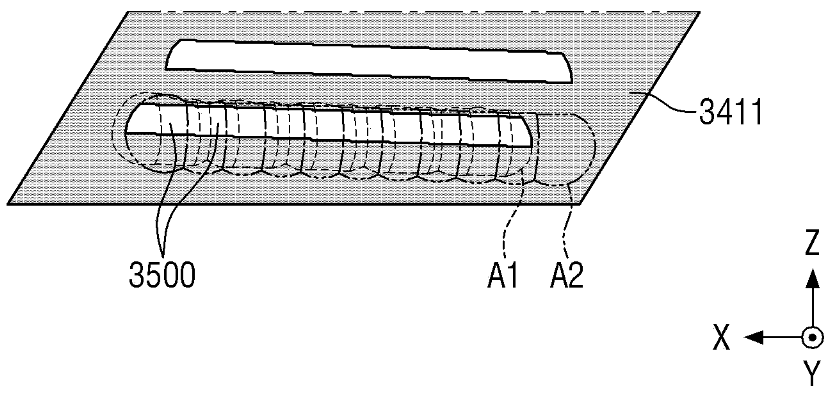
FIG. 17 is a schematic diagram illustrating a plurality of apertures formed within the overlapping area of FIG. 16.

Therefore, in this embodiment, as illustrated in FIG. 17, an aperture 3500 may be formed within the overlapping area A0 between the incident lens array A1 and the emission lens array A2, while no aperture 3500 is formed outside the overlapping area A0 such that the light outside the overlapping area A0 may be blocked by the deposition layer 3411. This configuration may prevent the light incident on the incident lenses 3100 outside the overlapping area A0 from progressing forward, and similarly, the light that would be directed toward emission lenses 3200 outside the overlapping area A0 may be blocked by the deposition layer 3411, thereby preventing glare that could be caused by the light emitted in an unintended direction.

FIG. 17 illustrates an exemplary front view of the vehicle lamp 1. When the vehicle lamp 1 is viewed from the front, the incident lens array A1 may be disposed further to the left and further up compared to the emission lens array A2. In this case, in the overlapping area A0, the left edge of the incident lens array A1, the right edge of the emission lens array A2, and the upper edge of the incident lens array A1 may be excluded. The lower end of each of the apertures 3500 may be disposed at or near the rear focus of the emission lenses 3200 that form the emission lens array A2 within the overlapping area A0. Further, the upper end of each of the apertures 3500 may be disposed at or slightly below the upper edge of the overlapping area A0, depending on the light distribution characteristics of the beam pattern to be formed by the vehicle lamp 1, to block light from being emitted in an unintended direction in advance.

In the above embodiment, the incident lenses 3100 included in the incident lens array A1 in the left-right row have no space therebetween, and the emission lenses 3200 included in the emission lens array A2 in the left-right row are also continuous and have no space therebetween. However, the present disclosure is not limited thereto. If the incident lenses 3100 and/or the emission lenses 3200 that form a row in the left-right direction are spaced apart, the apertures 3500 may be formed in areas where the incident lenses 3100 and the emission lenses 3200 do not overlap, as described above.

As described above, in the vehicle lamp 1, since the optical unit 3000 is tilted in at least one direction, and the apertures 3500 are formed only in the overlapping area A0 where the incident lenses 3100 and the emission lenses 3200 overlap with each other, light incident on the incident lenses 3100 outside the overlapping area A0 may be obstructed from being emitted through the emission lenses 3200 outside the overlapping area A0. This configuration prevents light from being emitted in unintended directions, thereby preventing glare and other undesirable effects.

In concluding the detailed description, those skilled in the art will appreciate that many variations and modifications can be made to the exemplary embodiments without substantially departing from the principles of the present disclosure. Therefore, the disclosed exemplary embodiments are to be used in a generic and descriptive sense only and not for purposes of limitation.

What is claimed is:

1. A vehicle lamp comprising a plurality of lamp modules, wherein each of the plurality of lamp modules comprises:

a light source unit that includes at least one light source and generates light;

an optical path adjustment unit that adjusts a path of the light emitted from the light source unit; and an optical unit that transmits at least some of the light emitted from the optical path adjustment unit to form a predetermined beam pattern, wherein the optical unit is tilted in at least one direction such that a first side thereof is disposed further forward than a second side thereof, wherein the optical unit includes:

a plurality of incident lenses;

a plurality of emission lenses corresponding to the plurality of incident lenses;

a deposition layer disposed between the plurality of incident lenses and the plurality of emission lenses to obstruct some light from proceeding toward the plurality of emission lenses; and a plurality of apertures that are formed in the deposition layer and allow some light to be transmitted toward the plurality of emission lenses, wherein one or more lenses among the plurality of incident lenses and the plurality of emission lenses are formed to be asymmetrical in at least one direction, wherein a first portion and a second portion within the one or more lenses with respect to a reference line that is parallel to a front-rear direction have curvatures that are different from each other, wherein the plurality of incident lenses and the plurality of emission lenses are arranged in a non-coaxial manner and staggered in a left-right direction such that the plurality of incident lenses and the plurality of emission lenses define an overlapping area, where at least one incident lens overlaps with at least one emission lens along a direction of light emission, and a non-overlapping area, where the plurality of incident lenses and the plurality of emission lenses do not overlap along the direction of light emission, and wherein each of the plurality of apertures is formed in the overlapping area.

2. The vehicle lamp of claim 1, wherein the light source unit is disposed such that an optical axis thereof is tilted in at least one direction with respect to a central axis of the optical path adjustment unit.

3. The vehicle lamp of claim 1, wherein the plurality of lamp modules are disposed such that a first side thereof is disposed further forward than a second side thereof in at least one direction.

4. The vehicle lamp of claim 1, wherein the light source units of the plurality of lamp modules are installed on a common substrate.

5. The vehicle lamp of claim 4, wherein the common substrate is tilted in at least one direction such that a first side thereof is disposed further forward than a second side thereof.

6. The vehicle lamp of claim 1, wherein the optical path adjustment unit includes an incident part, into which the light emitted from the light source unit is incident, and an emission part, through which the light incident into the incident part is emitted, and wherein the light incident into the incident part is formed into parallel light and emitted through the emission part.

7. The vehicle lamp of claim 6, wherein the incident part includes:

a first incident surface formed to be convex toward the light source unit;

a second incident surface that protrudes toward the light source unit from a periphery of the first incident surface; and a reflective surface that reflects light incident on the second incident surface toward the emission part.

8. The vehicle lamp of claim 6, wherein the emission part includes a plurality of emission surfaces having different curvatures.

9. The vehicle lamp of claim 6, wherein the emission part includes:

a first emission surface formed to be convex toward the front; and a second emission surface formed with a substantially flat shape around the first emission surface, wherein the first emission surface has a greater curvature than a first incident surface, which is formed in the incident part and convex toward the light source unit.

10. The vehicle lamp of claim 1, wherein at least some of the plurality of apertures are arranged along the left-right direction and interconnected to form a horizontal slit.

11. The vehicle lamp of claim 1, wherein the overlapping area is an area where an incident lens array, which is defined by incident lenses that are arranged in a left-right row, overlaps with an emission lens array, which is defined by emission lenses that are arranged in a left-right row.

12. The vehicle lamp of claim 11, wherein when the optical unit, which is tilted in at least one direction relative to the front-rear direction, is viewed from the front-rear direction, the overlapping area corresponds to an area where the incident lens array and the emission lens array overlap.

13. The vehicle lamp of claim 1, wherein a bottom edge of each of the plurality of apertures is disposed at or near a rear focus of a corresponding emission lens among the plurality of emission lenses, and wherein a top edge of each of the plurality of apertures is disposed at or below a top edge of the overlapping area.

* * * * *